Jan. 25, 1944.  H. F. WATERS  2,339,896
HEAT SEALING MACHINE
Filed March 28, 1941  2 Sheets-Sheet 2
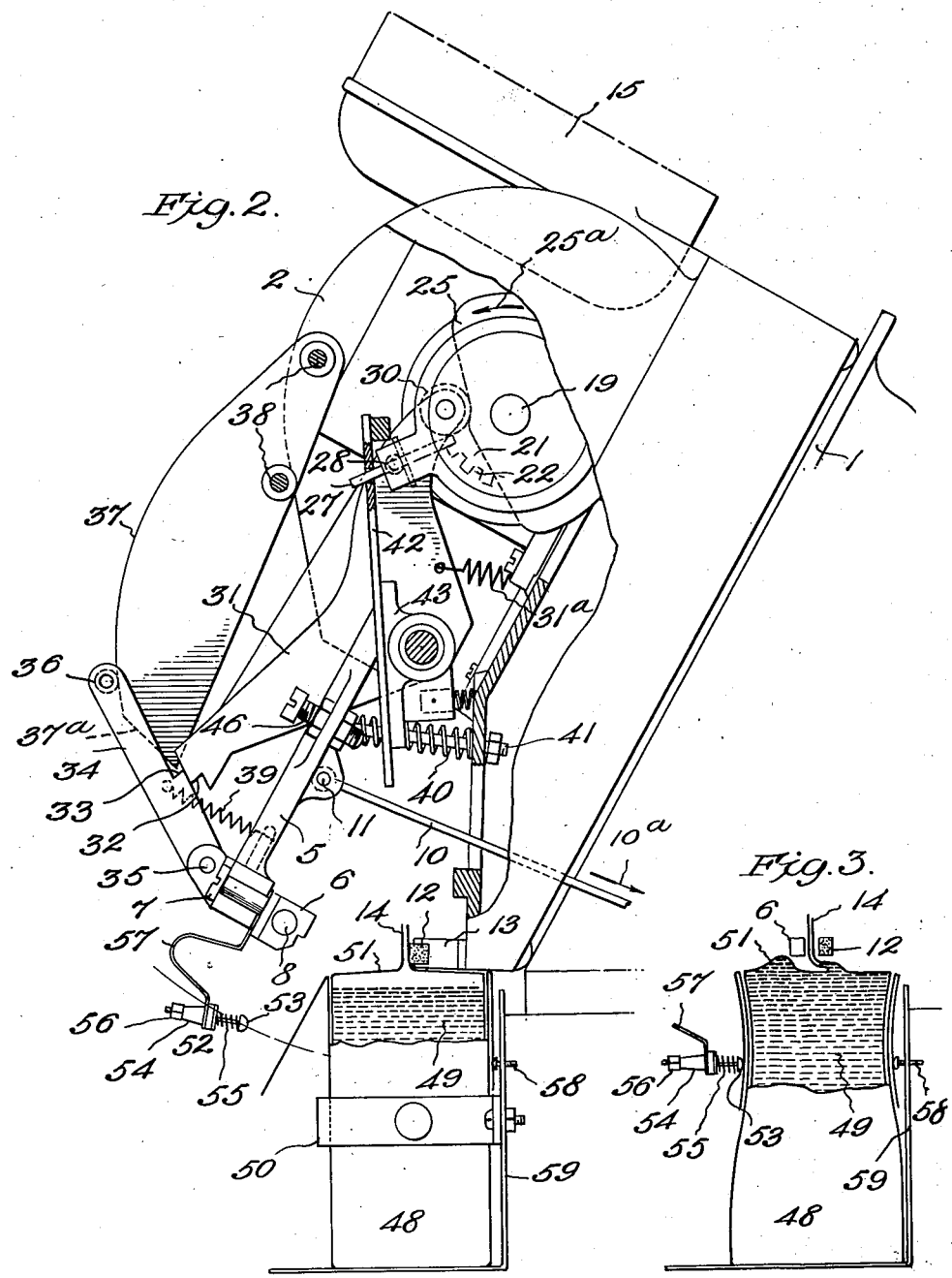
INVENTOR.
HARRY F. WATERS
BY Nicholas Langer
ATTORNEY Patented Jan. 25, 1944

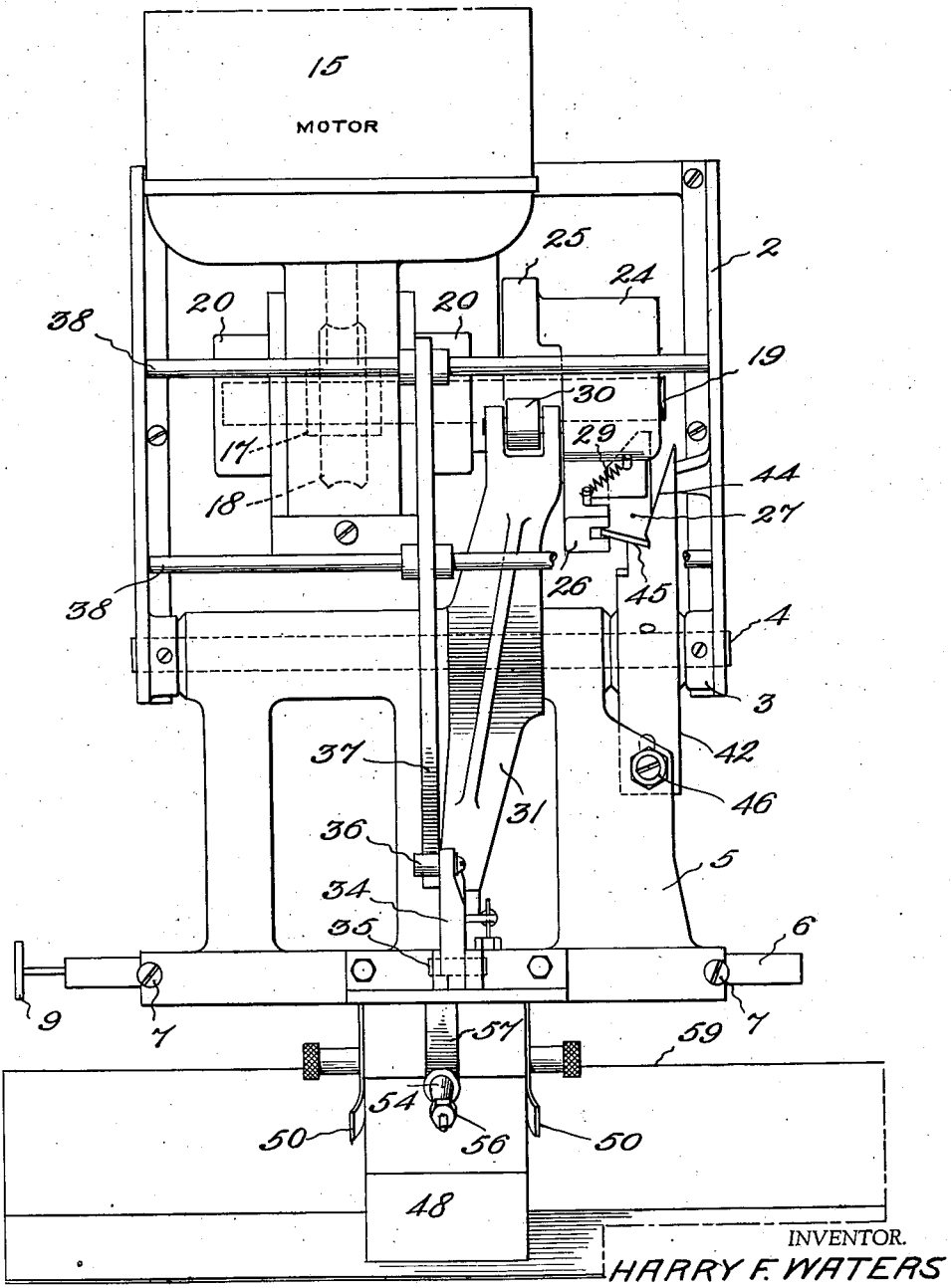

2,339,896

UNITED STATES PATENT OFFICE 2,339,896

HEAT SEALING MACHINE

Harry F. Waters, New York, N. Y.

Application March 28, 1941, Serial No. 385,707

16 Claims. (Cl. 226—56)

The present invention relates to heat sealing machines, and, more particularly, to a heat sealing machine of novel and improved character for applying heat and pressure to predetermined portions of a package in order to fuse and to autogenously bond such portions.

It is an object of the present invention to provide a heat sealing machine particularly adapted for applying a transverse flat seam to the upper terminal portions of a package or bag having heat-sealable material at least on the inner surface thereof.

It is another object of the present invention to provide a heat sealing machine of improved character including a pair of heat sealing members, at least one of which is heated and is displaceable with respect to the other by means of a combination of manually and automatically operable elements.

It is a further object of the invention to provide a packaging machine having means for applying heat and pressure to the mouth portions of a flexible-walled package in order to hermetically seal the same.

Still another object of the invention is the provision of a packaging machine including manually and automatically operable displaceable heat sealing members and having a safety device incorporated therein which positively prevents operation of the automatically operable elements until the displaceable members have been brought together to a distance sufficiently close to prevent insertion of the fingers of an operator therebetween.

It is also within the contemplation of the invention to provide a packaging machine having heat and pressure applying members and having auxiliary devices operatively associated with such members to perform certain operations, such as deformation or flattening of the packages, substantially synchronously with the operation of the machine.

The invention also contemplates a packaging and heat sealing machine of novel character which is simple in construction, positively safe in operation and which may be manufactured and operated on a practical and commercial scale at a low cost.

Other and further objects and advantages of the invention will become apparent from the following description, taken in conjunction with the accompanying drawings, in which Fig. 1 illustrates a front elevational view of a machine embodying the principles of the present invention;

Fig. 2 depicts a vertical sectional view, somewhat fragmentary in character and having parts in elevation, of the machine shown in Fig. 1; and Fig. 3 is a vertical sectional view, also fragmentary, showing the package illustrated in Fig. 2 during the progress of the heat sealing operation.

Broadly stated, according to the principles of my invention I provide a pair of heat sealing members, or bars, which may be of any appropriate shape in accordance with the packaging problem with which the particular machine is concerned. Generally speaking, I prefer to make one of these members of metal and maintain it at heat sealing temperatures for example by means of an electrical heating element inserted therein. The other or backing member may be constituted of a resilient material such as rubber and may be unheated. I provide both manually operable and automatically operable actuating elements for pressing these members against one another whereby heat and pressure may be applied unto sheets or layers of thermoplastic material introduced between the members. The manually operable elements preferably comprise a lever, or a treadle, actuation of which by means of hand or foot of the operator will bring the heat sealing members together. The automatically operable elements in the simplest case may comprise a continuously rotating driving shaft and a clutch operable in a predetermined closely adjacent position of the heat sealing members so that the manually initiated displacement of the members is completed by means of mechanical energy transmitted by the driving means through the clutch. I have found that in conventional machines having automatically operable members pressed against each other the danger of injury particularly to the fingers of the operator is very great. While this danger may be reduced by adjusting the clutch mechanism with respect to the manually operable elements so that the clutch does not become operative until the manually operable elements have brought the displaceable members into a closely adjacent position, a substantial danger remained when the driving means have been disconnected by switching off the motor and the manually operable elements have been accidentally displaced during this rest interval. Upon restarting the motor, the clutch being already in its operative position, the heat sealing members would be pressed together and would cause serious accidents if the fingers of the operator happened to be therebetween. I have discovered a novel safety device which normally prevents displacement of the sealing members under any operating conditions unless such members have been first manually brought into such closely-spaced position as to render insertion of the fingers of the operator between the sealing members impossible. According to a further aspect of my invention, I have found that various auxiliary devices may be advantageously associated with the heat sealing members to automatically carry out certain operations necessary or desirable during the heat sealing operation. Thus, for example, the displacement of the heat sealing members may be employed to simultaneously deform the package to be heat sealed in order to reduce the head space therein, this being particularly desirable in the packaging of liquids in flexible-walled containers. Likewise, it is possible to employ the displacement of the heat sealing device to exert pressure on certain portions of the package in its flattened or already erected condition, as this will be explained more fully as the description proceeds.

Referring now more particularly to Figs. 1 and 2 of the drawings, a preferred embodiment of the invention will be described. Reference character 1 denotes a frame support or similar structural element upon which the cooperating parts of the machine are mounted. This frame has a pair of heavy metal plates 2 mounted thereon in parallel-spaced position having a pair of bosses 3 in the lower portion thereof holding a transverse and stationary shaft 4. On this shaft is pivotally mounted a frame 5 having a generally E-shaped form with one of the intermediate portions missing. This frame has a metal heat sealing bar 6 mounted to the lower portion thereto by means of a plurality of bolts 7. Heat sealing bar 6 is provided with a longitudinally extending cylindrical cavity 8 in which a heating element, such as an electrical heating cartridge, may be housed to maintain the bar at heat sealing temperatures, as those skilled in the art will readily understand. From the left extremity of the heat sealing bar extends the dial of a thermometer 9 to indicate the temperature of the bar. Of course, suitable temperature control devices such as thermostats, and the like, may be incorporated into the heat sealing bar in order to maintain the temperature constant. To an intermediate portion of frame 5 is jointedly connected an actuating rod 10 by means of a pin 11. The other end of actuating rod 10 is connected to a treadle or similar foot or hand-operated device (not shown) whereby the frame may be displaced in the direction of arrow 10a towards a backing member 12 mounted by means of brackets 13 to the frame of the machine and may exert pressure thereon. I prefer to make this backing member of an elastic material such as rubber in accordance with the principles set forth in my Patent No. 2,125,758, dated August 2, 1938. Thus, it will be understood that by actuation of rod 10 frame 5 and heat sealing bar 6 thereon may be displaced toward backing member 12 and that heat and pressure may be applied to the upper terminal portions 14 of a bag constituted at least on the inner face thereof of a thermoplastic or heat-fusible material inserted between heat sealing bar 6 and backing member 12.

In addition to the described manually operable elements for displacing heat sealing bar 6 against backing member or bar 12, I also provide automatically operable elements for carrying out the same or a similar displacement of the heat sealing bar. Preferably these automatically operable elements are under the control of the position of the heat sealing bar with respect to the backing bar so that operation of these elements is possible only after the sealing bar is in a closely adjacent position to the backing bar so that accidental insertion of the fingers between the cooperating heat sealing members is impossible. The automatically operated elements essentially comprise an electric motor 15 mounted on the upper part of the machine frame and having a shaft with a worm 17 thereon. Worm 17 meshes with a suitable gear wheel 18 keyed to horizontal shaft 19 supported in bearings 20. Shaft 19 has a clutch wheel 21 rigidly connected to the right hand portion thereof, said wheel having circumferentially arranged uniformly spaced slots 22 therein engageable by means of a suitable clutch plate. Clutch wheel 21 is surrounded by a housing 24 having a cam surface 25 integrally formed therewith and having a radially protruding extension 26 in which clutch plate 27 is pivotally mounted on a pin 28. This clutch plate extends into the interior of housing 24 and its inner end is capable of extending into one of the depressions 22 in clutch wheel 21. Resilient means in the form of a spring 29 is tensioned between a pin on the clutch plate and a pin on housing, or casing, 24 so that in the normal position of rest the clutch plate is maintained in its operative position and connects casing 24 to horizontal shaft 19 to transmit rotation therefrom.

Cam surface 25 on casing 24 cooperates with a small roller 30 rotatably mounted at the upper end of a bell crank lever 31 pivotally mounted in shaft 4 and held by a spring 31a so that during rotation of casing 24 the bell crank lever will be displaced in accordance with the shape of cam surface 25. In view of the fact that bell crank lever 31 serves for transmission of the power from the driving mechanism to the heat sealing frame and bar, it is preferably formed as a single piece of heavy casting of substantial strength. The lower end of lever 31 is provided with a suitable surface or shoulder 32 adapted to cooperate with a similar surface 33 on a jointed pressure rod 34. Member 34 has one of its ends jointedly connected to frame 5 holding the heat sealing bar 6 by means of a pin 35, while its upper end carries a small roller 36 cooperating with a stationary cam plate 37 mounted on rods 38 between side plates 2 of the machine. The cooperation of cam plate 37 and roller 36 is assured by means of a coil spring 39 having its ends connected to frame 5 and pressure rod 34, respectively. A compression spring 40 guided by means of a bolt 41 protruding through an opening in the machine frame is provided to normally maintain heat sealing bar 6 and its carrying frame 5 separated from backing plate, or bar, 12.

The clutch actuating mechanism includes a check plate member 42 mounted on a tilting block 43 which is rotatably mounted on shaft 4. The upper end of check plate member 42 is provided with an inclined surface 44 adapted to cooperate with clutch plate 27 during the rotation of casing 24 to displace the clutch plate into its inoperative position in which the clutch is disengaged and casing 24 is separated from drive shaft 19. At the end of inclined surface 44 there is a shoulder 45 which acts as a stop for casing 24 after it has been disconnected from the clutch wheel. Frame 5 has a bolt 46 mounted in an intermediate portion thereof, the lower end of which can strike against the lower extremity of check plate member 42 in the depressed position of frame 5 to cause actuation of check plate member 42 and of the associated clutch mechanism, as it will be explained in the following.

From the foregoing description the operation of my novel heat sealing machine will be readily understood by those skilled in the art. It is to be observed at the outset that it is possible to carry out the heat sealing operation by actuation of the manually operable elements alone. Thus, for example, by depression of a treadle, or hand lever (not shown), frame 5 may be displaced and heat sealing bar 6 may be likewise displaced and pressed against backing member 12, this actuating being transmitted through rod 10. Of course, this type of operation would be too slow for carrying out heat sealing on an industrial scale. During displacement of frame 5, however, the automatically operable elements become operative. The lower end of bolt 46 inserted in frame 5 will strike against the lower portion of check plate member 42 thereby tilting the same about shaft 4. This tilting displacement of the check plate member will cause disengagement of clutch plate 27 which will be pulled by means of spring 29 into its operative position in which it engages one of the depressions of clutch wheel 21 rotated by means of motor 15 through worm gear 16 and 17. The actuation of the clutch will connect casing 24 to clutch plate 21 for joint rotation and will rotate casing 24 and cam 25 thereon in the direction of arrow 25a. During the rotation of cam 25, bell crank lever 31, the upper end of which bears roller 30 pressed against cam surface 25, will be tilted about shaft 4. This displacement of bell crank lever 31 may be transferred by means of cooperating surfaces 32 and 33 to frame 5 and heat sealing bar 6, provided that roller 36 has arrived to a predetermined position on cam plate 37.

From a study of the drawing, particularly of Fig. 2 and of the foregoing description, it is clear that the clutch mechanism is actuated only after bolt 46 tilts check plate member 42. In this position in which the automatically operable elements take over further actuation of the heat sealing member, the heat sealing member 6 is in such close proximity to the backing member 12 that while the mouth portions 14 of a flexible-walled container may be inserted therebetween, it would be impossible for the operator to insert his fingers into this greatly reduced space. This type of construction and operation would seem to provide sufficient safety for the operator. It has been found, however, that in some cases an accident is still possible such as for example in the case when the motor is switched off and while in such inoperative position, frame 5 is depressed by means of rod 10. This may cause in certain positions of cam 25 to tilt the check plate member 42 and to establish connection between casing 24 and the driving means due to the engagement of clutch wheel 21 by means of clutch plate 27. After this manually exerted displacing pressure has been removed, the frame 5 will return into its widely open position by means of spring 40. When the motor is restarted, an accident could result if the operator's fingers would be resting in the space between heat sealing member 6 and backing member 12. To eliminate even this possibility of accident and to completely remove any danger whatsoever from the operation of the machine, I provide additional protection by the incorporation of a further safety device. This device consists in the separation of frame 5 and bell crank lever 31. It will be noted in Fig. 2, that in the normal position of rest, roller 36 of pressure rod 34 is riding on the higher portion of cam plate 37. In this position shoulder 32 of bell crank lever 31 is disconnected from the corresponding shoulder 33 on pressure rod 34. Obviously, if in this disconnected position of these elements bell crank lever 31 would be actuated for any reason, such actuation would be without effect on frame 5. Engagement between shoulders 32 and 33 occurs only after frame 5 has been manually displaced to an extent sufficient to bring roller 36 in contact with the lowermost and steeply inclined portion 37a of cam plate 37. The cooperating parts of the machine are so constructed and arranged and the shape of cam plate 37 is so determined that such engagement between the shoulders occurs only after heat sealing bar 6 is in immediate proximity to backing bar 12, in which position the insertion of the fingers of the operator is impossible. In other words, a double action or two-stage safety device is provided, the first stage of which comprises the clutch mechanism including check plate member 42 connecting the automatically operable actuating mechanism to the driving means only at the very end of the manual displacement of frame 5. This safety action is further supplemented by the second stage comprising the normally disconnected arrangement of bell crank lever 31 from rod 34 whereby the connection of these members is effected only at the very end of the stroke of heat sealing bar 6. Therefore, an absolute safety of operation is assured even in the case when relatively inexperienced operators are employed.

From the foregoing description it is clear that when it is desired to apply a heat seal to a flexible-walled package 48 filled with a liquid or similar contents 49, the package is inserted into the machine in heat sealing position determined by means of lateral guide plates 50. In this position the mouth portions 14 of the package will protrude into the space between heat sealing members 6 and 12. Upon manual depression of frame 5, heat sealing member, or bar, 6 is displaced in the direction of backing member 12 and at a time when it is almost in contact with mouth portions 14, the clutch mechanism and the safety device become operative and the further and powerful compression and heat welding of the mouth portion takes place, the power for this operation being derived from motor 15. After this has been accomplished, during further rotation of cam 25, clutch plate 27 will strike against the inclined surface 44 on check plate member 42 which will disengage the clutch and will stop the disconnected casing 24 in a position determined by surface 45 on the check plate member. In this position the machine is prepared for the next operation. It has been found that my heat sealing device can carry out a large number of heat sealing operations within a relatively short time combining high speed of operation with positive safety for the operator.

The packages principally contemplated by the machine embodying the present invention are of the type disclosed, for example, in my copending application Ser. No. 743,957 filed September 14, 1934. These packages generally comprise an outer carton 48 substantially determining the shape of the package and an inner bag or container 51 constituted of flexible and fluid-tight material arranged within the carton. In packages of the described character and containing a liquid such as oil or milk, it is of great importance to substantially eliminate all head space or air space at the top of the inner container. This is accomplished for example by deforming or squeezing the liquid filled package to raise the liquid level and to substantially remove the air, and then sealing the container while it is in such deformed position. I have found that this deforming operation of the container may be accomplished in a simple manner by means of an auxiliary device connected to the heat sealing machine. This device comprises deforming member 52 including a pin 53 slideably mounted in a sleeve 54 and resiliently held therein by means of a coil spring 55 and a nut 56. Sleeve 54 is attached to heat sealing bar 6 and frame 5 by means of a curved metal plate 57 of strong but somewhat resilient material. As it will be observed in Fig. 3, upon manual or automatic actuation of frame 5, deforming member 52 will be pressed against the outer surface of the flexible-walled package and will inwardly press the side wall thereof. Of course, this will cause raising of the liquid level and substantially eliminates the undesirable head space. At the same time heat sealing bar 6 will be pressed against the mouth portions 14 of the package which will be hermetically sealed while the package is maintained in this deformed position. After release of the heat sealing members, the package will assume its former shape and its flexible top portions will slightly collapse. It has been found that a package sealed in this manner is capable of resisting very substantial external stresses because deformation of the flexible-walled package during transportation or storage will not apply excessive pressure of the noncompressible liquid against the sealed regions but will merely result in paying out the excess material in the top region and other regions of the package. The action of displaceable deforming member 52 may be further supplemented by the provision of a stationary deforming member in the form of a screw 58 inserted in plate 59 preferably opposite to the operative position of displaceable deforming member 52.

Although the present invention has been described in connection with a preferred embodiment thereof, variations and modifications may be resorted to by those skilled in the art without departing from the principles of the present invention. Thus, for example, the present invention may be advantageously applied to thermal sealing machines of the type disclosed in my copending applications Ser. Nos. 346,515 and 346,516, filed July 20, 1940. I consider all of these variations and modifications as within the true spirit and scope of the present invention, as disclosed in the foregoing description and defined by the appended claims.

I claim:

1. In a sealing machine, the combination which comprises sealing members, a reciprocatory support for at least one of said members, reciprocating means for said support, continuously rotating means for operating said reciprocating means, a clutch intermediate to said rotating means and said reciprocating means, means operable in predetermined position of said support to actuate said clutch and thereby to actuate said reciprocating means, and means operable in the closely adjacent manually displaced position of said sealing members to couple said reciprocating means with said reciprocatory support thereby to automatically complete the manually initiated displacement of the support.

2. In a heat sealing machine, the combination which comprises a plurality of sealing members adapted to cooperate with each other to apply heat and pressure to thermoplastic materials inserted therebetween, a reciprocatory support for at least one of said members, manually operable elements for displacing said support into heat sealing position, a reciprocable actuating member for said support normally disconnected therefrom, means including a motor and a clutch and an eccentric for reciprocating said member, means operable in predetermined position of said support to actuate said clutch thereby to cause reciprocation of said actuating member, and means operable by manual displacement of said support into closely adjacent position of said sealing members to couple said reciprocable actuating member to said support thereby to automatically complete the manually initiated displacement of the support.

3. In a sealing machine; the combination which comprises a stationary and a reciprocable sealing member; manually operable elements for reciprocating said reciprocable sealing member; automatically operable elements including a motor, a clutch, a cam, and an actuating lever for reciprocating said sealing member; means under the control of said manually operable elements for operating said clutch and said actuating lever; and means operable by manual displacement of said reciprocable sealing member into a position closely adjacent to the stationary sealing member to couple said actuating lever to said reciprocable sealing member and thereby to automatically complete the manually initiated displacement of said member.

4. In a sealing machine, the combination which comprises a stationary and a reciprocable sealing member, manually operable elements for reciprocating said reciprocable sealing member, automatically operable elements including a motor driven clutch-controlled eccentric for reciprocating said reciprocable member, said last-mentioned elements being normally disconnected from said reciprocable sealing member, and means responsive to manual displacement of said reciprocable sealing member into a closely adjacent position with respect to said stationary sealing member to connect said reciprocable sealing member to said automatically operable elements thereby to complete the manually initiated displacement of said member.

5. In a sealing machine, the combination which comprises a sealing member and a backing member adapted to cooperate therewith, at least one of said members being reciprocable, manually operable elements for reciprocating said reciprocable member, automatically operable elements including a motor, a clutch and a cam mechanism for reciprocating said reciprocable member but normally disconnected therefrom, a clutch control mechanism, and means independent from said clutch control mechanism and responsive to manual displacement of said reciprocable member into a predetermined position to connect the reciprocable member to said automatically operable elements, said predetermined position being sufficiently close to the other member to prevent the presence of the fingers of the operator between the sealing and the backing member.

6. In a sealing mechanism, the combination comprising a reciprocative sealing press, manually operable elements for progressively actuating said press, automatically operable elements normally disconnected from said press and including a motor and a rotatable cam device for actuating said press, and safety means independent from said automatically operable elements responsive to predetermined progress of said press during manual actuation thereof to connect said press to said automatically operable elements thereby to automatically complete a manually initiated sealing cycle.

7. In a sealing mechanism, the combination comprising a reciprocative sealing press, manually operable elements for progressively actuating said press, automatically operable elements for actuating said press including a motor, a clutch, a rotatable cam device, and a cam follower mechanism normally disconnected from said press, a clutch actuating mechanism adapted to make said automatically operable elements operative without actuating said press, and means independent from said clutch and responsive to predetermined progress of said press during manual actuation thereof to connect said press to said cam follower mechanism thereby to automatically complete a manually initiated sealing cycle.

8. In a sealing mechanism, the combination of a reciprocative sealing press; manually operable elements for progressively actuating said press; automatically operable elements for actuating said press including a motor, a clutch, a rotatable cam device, and a cam follower mechanism normally disconnected from said press; and a two-stage safety device for said automatically operable elements the first stage of which comprises a clutch actuating mechanism responsive to predetermined progress of said press during manual actuation thereof and the second stage of which comprises a mechanism responsive to further progress of said press for connecting the press to said cam follower mechanism.

9. In a sealing mechanism for applying heat and pressure to predetermined portions of superposed layers of flexible material fusible on at least one face thereof, the combination of a reciprocative sealing press; manually operable elements for progressively displacing said press from an inoperative into an operative and heat sealing position; automatically operable elements for actuating said press including a motor, a clutch, a rotatable cam device, and an actuating lever normally disconnected from said press; and a two-stage safety device for said automatically operable elements the first stage of which comprises a clutch actuating mechanism responsive to predetermined progress of said press during manual actuation thereof and the second stage of which comprises a device responsive to further progress of said press for connecting the press to said actuating lever whereby the manually initiated preliminary displacement of said press is automatically completed.

10. In a sealing mechanism for applying heat and pressure to predetermined portions of superposed layers of flexible material fusible on at least one face thereof, the combination of a heated sealing bar, a mounting frame for oscillatably holding said sealing bar along an arcuate path, a resilient stationary backing bar cooperating with said sealing bar, a manually operable element for displacing said frame, automatically operable elements including a motor, an eccentric, and a reciprocable actuating lever for displacing said frame, said last-mentioned elements being normally disconnected from said frame, and means responsive to predetermined manual displacement of said frame to couple the frame to said actuating lever thereby to complete a sealing stroke.

11. In a sealing mechanism for applying heat and pressure to predetermined portions of superposed layers of flexible material fusible on at least one face thereof, the combination of a heated sealing bar, a pivotally mounted frame for oscillatably holding said bar along an arcuate path, a resilient stationary backing bar cooperating with said sealing bar, a manually operable element for displacing said frame, automatically operable elements including a continuously rotating motor-driven cam mechanism and an actuating lever reciprocated by said cam mechanism, and means responsive to predetermined manual displacement of said frame to couple the frame to said reciprocating actuating lever, said last-mentioned means comprising a push rod jointedly mounted on said frame and having a surface engageable by a corresponding surface of said actuating lever, and a stationary cam constructed and arranged to guide the surfaces on said push rod and on said actuating lever into mutually engaging position after said predetermined manual displacement of the frame.

12. In a sealing mechanism for applying heat and pressure to predetermined portions of superposed layers of flexible material fusible on at least one face thereof, the combination of a heated sealing bar, a pivotally mounted frame for holding said bar oscillatably along an arcaute path, a resilient stationary backing bar cooperating with said sealing bar, a manually operable element for displacing said frame, automatically operable elements including a continuously rotating motor, a clutch, a cam device, and an actuating lever reciprocable by said cam device, means responsive to predetermined manual displacement of said frame to operate said clutch and to cause reciprocation of said actuating lever, and means responsive to further manual displacement of said frame to couple the frame to said reciprocating actuating lever, said last-mentioned means comprising a push rod jointedly mounted on said frame and having a surface engageable by a corresponding surface of said actuating lever, and a stationary cam constructed and arranged to guide the free end of the push rod to bring the said cooperating surfaces into mutually engaging position after said further manual displacement of the frame.

13. In a sealing machine, the combination which comprises sealing members adapted to cooperate with each other to apply heat and pressure to the mouth of a heat-sealable bag contained in a paperboard package, a reciprocatory support for at least one of said members, reciprocating a pressing member for said support, and means operable by said support to apply pressure to the package below the mouth of the bag.

14. In a heat sealing machine, the combination which comprises sealing members adapted to cooperate with each other to apply heat and pressure to the mouth of a heat-sealable bag contained in a paperboard package, a reciprocatory support for at least one of said members, means for reciprocating said support, and a pressing member operatively connected to said support and displaceable thereby during reciprocation of the support to apply pressure to the package below the mouth of the bag at least immediately prior to and during cooperation of said sealing members.

15. In a machine for packaging liquids in containers including an outer carton and an inner bag having a fusible inner surface, the combination of a heated sealing member and a resilient backing member, a reciprocatory support for said sealing member, means for holding a carton having a liquid-filled bag therein with the mouth portions of the bag extending between said members, means for reciprocating said support to apply heat and pressure to a transverse strip of the mouth portions of the bag for hermetically sealing the same, and a deforming member resiliently mounted on said reciprocatory support constructed and arranged to engage one of the side walls of said carton during reciprocation of said support and before said sealing and backing members become operative whereby the liquid level is raised and the detrimental head space in the bag is substantially reduced before the bag is hermetically sealed.

16. In a machine for packaging liquids in containers including an outer carton and an inner bag having a fusible inner surface, the combination of a heated sealing member and a resilient backing member, a reciprocatory support for said sealing member, means for holding a carton having a liquid filled bag therein with the mouth portions of the bag extending between said members, means for reciprocating said support to apply heat and pressure to a transverse strip of the mouth portions of the bag for hermetically sealing the same, a displaceable deforming member resiliently mounted on said reciprocatory support constructed and arranged to engage one of the side walls of said carton during reciprocation of said support, and a stationary deforming member arranged to engage the wall opposite to the one engaged by the displaceable deforming member whereby said bag is deformed and the liquid level therein is raised immediately prior to hermetically sealing the bag.

HARRY F. WATERS.